United States Patent [19]

Tamura et al.

[11] Patent Number: 4,804,720

[45] Date of Patent: Feb. 14, 1989

[54] POLYAMIDE RESIN COMPOSITION

[75] Inventors: Mitsuhiko Tamura; Masaaki Miyamoto; Masaya Ueda, all of Kitakyushu; Eiichi Kamoshida, Fujisawa, all of Japan

[73] Assignee: Mitsubishi Chemical Industries Limited, Tokyo, Japan

[21] Appl. No.: 178,224

[22] Filed: Apr. 6, 1988

[30] Foreign Application Priority Data

Apr. 8, 1987 [JP] Japan .................. 62-86269

[51] Int. Cl.[4] .................. C08L 77/00; C08K 9/04
[52] U.S. Cl. .................. 525/431; 524/114; 524/166; 524/262; 524/606; 524/265
[58] Field of Search .............. 525/431; 524/606, 114, 524/166, 262, 265

[56] References Cited

U.S. PATENT DOCUMENTS

| 4,678,835 | 7/1987 | Chang et al. | 525/431 |
| 4,684,697 | 8/1987 | Chang et al. | 525/431 |

FOREIGN PATENT DOCUMENTS

| 51-7055 | 1/1976 | Japan . |
| 51-7056 | 1/1976 | Japan . |
| 5852820 | 7/1977 | Japan . |

Primary Examiner—Harold D. Anderson
Assistant Examiner—T. Mason
Attorney, Agent, or Firm—Oblon, Fisher, Spivak, McClelland & Maier

[57] ABSTRACT

Disclosed herein is a polyamide resin composition comprising a polyamide resin, from 0.1 to 1% by weight of fine silica based on the polyamide resin and from 1 to 99% by weight of a silane coupling agent based on the fine silica. The packaging material obtained from the polyamide resin composition of the present invention has uniform and satisfactory transparency and is excellent in the blocking resistance.

10 Claims, No Drawings

POLYAMIDE RESIN COMPOSITION

BACKGROUND OF THE INVENTION

The present invention relates to a polyamide resin composition for producing polyamide packaging material having excellent and uniform transparency and also being excellent in blocking resistance (sliding property).

It has been known that the polyamide packaging material is excellent in pinhole-free property, oil resistance and oxygen barrier property, but conventional polyamide packaging material is liable to cause blocking thereby impairing the workability upon packing or packaging. As the method of improving the blocking resistance of a polyamide packaging material, there has been known a method of modifying the surface structure of a packaging material (refer to Japanese Patent Publication No. 40-958 (1965)), a method of adding a fatty acid amide (refer to Japanese Patent Publication No. 33-9788 (1958)) or a method of modifying the surface property of a packaging material by adding fine powder of inorganic substance (refer to Japanese Patent Laid-Open No. 49-42752 (1974)). Among them, the method of adding fine powder of inorganic substance have been most preferred for the improvement of the blocking resistance. By the way, in the case of adding fine powder of inorganic substance, the improvement for the blocking resistance conflicts with the high transparency and, particularly, in the case of a polyamide packaging material, hazing tends to occur due to crystallization of the fine powder of inorganic substance upon cooling, thereby often causing loss of transparency.

In view of the above, the present inventors have made an earnest study for providing a polyamide resin composition suitable to the production of packaging material which is improved in the blocking resistance without impairing the transparency and, as a result, have found that the blocking resistance can be improved without impairing the transparency by preparing a packaging material such as in the form of films, sheets, blowmolding containers, etc., using a polyamide composition containing from 0.01 to 1 % by weight of fine silica to polyamide resin and from 1 to 99 % by weight of a silane coupling agent to the fine silica. The present invention has been accomplished based on this finding.

SUMMARY OF THE INVENTION

In a first aspect of the present invention, there is provided a polyamide composition comprising a polyamide resin, from 0.01 to 1 % by weight of fine silica based on the polyamide resin, and from 1 to 99 % by weight of a silane coupling agent based on the fine silica.

In a second aspect of the present invention, there is provided a packaging material produced from a polyamide resin composition comprising a polyamide resin, from 0.01 to 1 % by weight of fine silica based on the polyamide resin, and from 1 to 99 % by weight of a silane coupling agent based on the fine silica.

In a third aspect of the present invention, there is provided a use of a polyamide resin composition for producing a packaging material, said polyamide resin composition comprising a polyamide resin from 0.01 to 1 % by weight of fine silica based on a polyamide resin, and from 1 to 99 % by weight of a silane coupling agent based on the fine silica.

DETAILED DESCRIPTION OF THE INVENTION

The present invention intends to provide a composition comprising a polyamide resin, fine silica and a silica coupling agent suitable to the production of packaging material such as packaging films, packaging sheets, blow-molding containers, etc., excellent in the transparency and the blocking resistance.

The polyamide resin usable in the present invention can include those polyamide resins obtained from polycondensation of lactams of 3 or more membered ring, polymerizable ω-amino acid, or dibasic acid and diamine. Specifically, there can be mentioned, polymers of ε-caprolactam, amino capronic acid, enanthlactam, 7-aminoheptanoic acid, 11-aminoundecanoic acid, 9-aminononanoic acid, α-pyrrolidone, α-piperidone, etc., polymers or copolymers obtained by the polycondensation of diamine such as hexamethylene diamine, nonamethylene diamine, undecamethylene diamine, dodecamethylene diamine, methaxylylene diamine, etc. with dicarboxylic acid such as terephthalic acid, isophthalic acid, adipic acid, sebacic acid, dodecanedioic acid, glutalic acid, etc. For example, nylon 4, 6, 7, 8, 11, 12, 6.6, 6.9, 6.10, 6.11, 6.12, 6T, 6/6.6, 6/12, 6/6T, are exemplified.

The silane coupling agent used in the present invention can include, for example, an organosiloxane represented by the formulae:

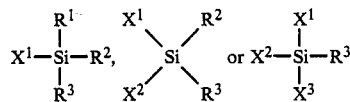

wherein $X^1$, $X^2$ and $X^3$ independently represent alkoxy group having 1 to 3 carbon atoms, $R^1$, $R^2$ and $R^3$ independently represent lower alkyl group such as methyl group, ethyl group or propyl group; higher alkyl group such as stearyl group, lauryl group, bephenyl group; alkenyl group such as vinyl group or allyl group; cycloalkyl group such as cyclopropyl group or cyclohexhyl group; aryl group such as phenyl group or benzyl group; N-(aminoalkyl)aminoalkyl group such as N-(β-aminoethyl)-γ-aminopropyl group; or alkyl group substituted at ω-position thereof with amino group, halogen, mercapto group, glycidoxy group or acyloxy group such as γ-aminopropyl group, γ-chloropropyl group, γ-mercaptopropyl group, γ-glycidoxypropyl group, or γ-methacryloxy propyl group; organosilazane, organosilylamine, organosilylurea, N-organosilylcarboxylic acid amide and N-organosilyl halocarboxylic acid amide.

Specifically, there can be mentioned, for example, trimethylmethoxysilane, vinyltriethoxysilane, γ-(chloropropyl)trimethoxysilane, γ-(aminopropyl)triethoxysilane, N-(β-aminoethyl)-γ-(aminopropyl)trimethoxysilane, γ-(mercaptopropyl)trimethoxysilane, γ-(glycidoxypropyl)trimethoxysilane, γ-(methacryloyloxypropyl)trimethoxysilane, hexamethyldisilazane, N,N'-bis(trimethylsilyl)urea, N,N'-bis(trimethylsilyl)acetoamide, diethyl(trimethylsilyl)amine, N,N'-bis(trimethylsilyl)trifluoroacetamide and stearyltrimethoxysilane.

Among them, silane having aminoalkyl group such as γ-(aminopropyl)triethoxysilane or N-(β-aminoethyl)-γ-(aminopropyl) trimethoxysilane is preferred in view of the affinity with polyamide.

Silica can be divided generally into wet process silica and dry process silica depending on the production process. Any of them can be used as the starting material for use in the present invention and use of the wet process silica is preferred.

Generally, although the primary particle diameter of silica is usually from 0.01 to 0.1 μm, the primary particles are usually agglomerated to form secondary particles and tertiary particles having a diameter of about 0.1–30 μm size. Since if agglomerated silica of large diameter is present in a film, it may cause so-called fish eyes to degrade the commercial value of the film, the average particle diameter of the agglomerates of fine silica used in the present invention is preferably not more than 20 μm and, more preferably, not more than 10 μm. On the contrary, if the average particle diameter of the fine silica is too small, protrusions may be not formed at the film surface thereby impairing the blocking resistance effect and, accordingly, it is preferred that the average particle diameter of the fine silica determined by the coulter counter method is not less than 0.01 μm and, preferably, than 0.05 μm.

The addition amount of the fine silica in the present invention is from 0.01 to 1 % by weight, preferably, from 0.05 to 0.5 % by weight and, further preferably, from 0.1 to 0.4 % by weight based on the polyamide resin.

If the amount of the fine silica used is less than 0.01 % by weight, no substantial blocking resistant effect can be obtained and, while on the other hand, transparency of the resultant packaging material will be lost if the addition amount exceeds 1 % by weight.

The addition amount of silane coupling agent in the present invention is from 1 to 99 % by weight, preferably, from 5 to 70 % by weight and, more preferably, from 10 to 40 % by weight based on the fine silica. If the amount of the silane coupling agent used is less than 1 % by weight based on the fine silica, no substantial effect can be obtained for preventing the haze of the film upon film-preparation. While on the other hand, if the amount exceeds 99 % by weight, agglomeration readily occurs between the coupling agent with each other, which cases undesirable fish eyes, etc. in the film.

The method of incorporating the fine silica and the silane coupling agent into the polyamide resin has no particular restriction, and the fine silica and the silane coupling agent or fine silica previously treated with the silane coupling agent may be added at any stage from the production of the polyamide resin to the film formation.

Specifically, there can be mentioned (1) a method of adding fine silica treated by adding a silane coupling agent diluted with water to the silica while heating under stirring, or fine silica and silane coupling agent at an optional step before the starting of the polymerizing reaction at the initial stage (under normal pressure) to the starting of the polymerizing reaction under a reduced pressure in the production process for the polyamide resin, (2) a method of dry blending the fine silica treated by the silane coupling agent in the same manner as above with the polyamide resin, or the method of further melting and kneading the thus obtained blend, or (3) a method of dry blending the fine silica and the silane coupling agent with the polyamide resin or a method of further melting and kneading the thus obtained blend.

The packaging material referred to in the present invention means those packaging materials including films, sheets, blow-molding containers, which are molded by means of molding processes applied generally to thermoplastic resins such as extrusion molding, for example, T-die method, inflation method, as well as injection molding, blow molding and vacuum molding. Further, it is also possible to add and introduce other ingredients, for example, pigment, dye, heat resistance improving agent, anti-oxidant, weathering stabilizer, lubricant, crystalline nucleus agent, antistatic agent, plasticizer, other polymers, etc. providing that they do not impair the molding property and the physical property of the resultant product (packaging material).

Further, in the case of molding the polyamide composition according to the present invention into a film or sheet packaging material, it may be stretched with known method or may be formed with no stretching.

Furthermore, known resin may be laminated on the polyamide packaging material by means of known technic such as coextrusion or lamination.

When the polyamide composition according to the present invention is used as the starting material, packaging material satisfactory in the transparency and excellent in the blocking resistance can be obtained, and the improving effect in the transparency and the blocking resistance is particularly remarkable for the films prepared by the water-cooling method.

The present invention is described more precisely while referring the following non-limitative examples.

Measurement was conducted by the following methods.

(a) Average Particle Diameter

The volume average particle diameter was determined by the coulter counter method.

(b) Relative Viscosity of Polyamide Resin

The relative viscosity was measured by using 98 % sulfuric acid in accordance with JIS K 6810-1970.

(c) Sliding Property

Friction coefficient (μs) was measured in accordance with ASTM D 1894-63 at 23° C. 50 %RH, at 23° C. 65 RH or at 23° C. 80 %RH.

(d) Haze

Fifteen circular specimens of 15 mm diameter were sampled at an equal distance in the direction perpendicular to the machine direction from extruded films and stretched films Haze was measured by using a haze meter manufactured by Tokyo Denshoku Co. in accordance with the method of JIS K6714.

A film with a smaller difference between the maximum and the minimum values for the measured haze is more excellent film with leser variation in the haze.

EXAMPLES 1-5

Fine silica with the average particle diameter as described in Table 1 and aqueous solutions of silane coupling agents shown in Table 1 prepared by dilution with water to 6 times were mixed under heating to 80° C. in a super mixer and the water was evaporated. Then, surface-treated fine silica was obtained by drying at 120° C.

The thus obtained surface-treated fine silica was added to nylon 6 during production thereof at the weight ratio described in Table 1, and the polymerization was conducted by the ordinary method to obtain a nylon 6 composition.

The nylon 6 composition was added with 0.1 % by weight of ethylenebisstearoamideand extruded from a ring dice of 75 mm φ diameter by using a 40 mm extruder to prepare an inflation film of flattened tube width of 130 mm by the watr cooling method (water temperature at 18° C.). Further, the thus prepared film was stretched by 3.0×3.0 at a temperature of 80° C. using a stretcher manufactured by a Long Co., and heat-set at 200° C. for 10 sec to obtain a stretched film of 15 μm thickness.

The result for each of the measurements is shown in Table 1.

COMPARATIVE EXAMPLES 1-5

Compositions were obtained and films were formed in the same procedures as in Examples 1-5 using the same fine silica as in Examples 1-5 except for not using the silane coupling agent. The results are described in Table 2.

TABLE 1

| | Example | | | | |
|---|---|---|---|---|---|
| | 1 | 2 | 3 | 4 | 5 |
| Polyamide resin | nylon 6 | nylon 6 | nylon 6 | nylon 6 | nylon 6 |
| Silica | Nipsil E220A* | Aerosil #130* | Karplex CS-7* | Syloid #244* | Syloid #150* |
| Specific surface area of silica used (m²/g) | 130 | 130 | 130 | 300 | 300 |
| Volume average particle diameter of silica (μm) | 2.2 | 1.1 | 2.8 | 3.5 | 2.5 |
| Silane coupling agent | N—(β-aminoethyl)-γ-aminopropyl-trimethoxysilane | same to left | same to left | same to left | γ-aminopropyl-triethoxysilane |
| Amount of silane coupling agent added (wt % based on the amount of silica) | 12 | 12 | 12 | 28 | 28 |
| Amount of surface treated silica added (wt % based on the amount of polyamide resin) | 0.20 | 0.3 | 0.10 | 0.08 | 0.15 |
| Relative viscosity of polyamide | 3.68 | 3.73 | 3.62 | 3.72 | 3.70 |
| Haze of nonstretched film (%) | | | | | |
| Max | 3.7 | 2.8 | 4.7 | 3.4 | 3.2 |
| Min | 3.2 | 2.4 | 4.1 | 3.0 | 2.8 |
| Difference | 0.5 | 0.4 | 0.6 | 0.4 | 0.4 |
| Haze of stretched film (%) | | | | | |
| Max | 1.9 | 1.4 | 2.4 | 1.8 | 1.6 |
| Min | 1.6 | 1.2 | 2.0 | 1.5 | 1.4 |
| Difference | 0.3 | 0.2 | 0.4 | 0.3 | 0.2 |
| Static friction coefficient of stretched film (μs) | 0.7 | 2.0 | 0.7 | 0.6 | 0.7 |

TABLE 2

| | Comparative Example | | | | |
|---|---|---|---|---|---|
| | 1 | 2 | 3 | 4 | 5 |
| Polyamide resin | nylon 6 | nylon 6 | nylon 6 | nylon 6 | nylon 6 |
| Silica (%) | Nipsil E220A* | Karplex CS-7* | Syloid #150* | Syloid #244* | Aerosil #130* |
| Silane coupling agent | — | — | — | — | — |
| Amount of silica added (wt %) | 0.20 | 0.10 | 0.15 | 0.08 | 0.3 |
| Relative viscosity of polyamide | 3.75 | 3.80 | 3.74 | 3.72 | 3.71 |
| Haze of film not stretched (%) | | | | | |
| Max | 5.0 | 5.8 | 4.6 | 4.8 | 4.2 |
| Min | 2.8 | 3.0 | 2.5 | 2.6 | 2.0 |
| Difference | 2.2 | 2.8 | 2.1 | 2.2 | 2.2 |
| Haze of stretched film (%) | | | | | |
| Max | 3.4 | 3.8 | 3.3 | 3.4 | 2.5 |
| Min | 1.4 | 1.8 | 1.3 | 1.4 | 1.1 |
| Difference | 2.0 | 2.0 | 2.0 | 2.0 | 1.4 |
| Static friction coefficient of stretched film (μs) | 0.8 | 0.7 | 0.8 | 0.7 | 2.2 |

Note
*Trade marks of products: Nipsil E220A by Nippon Silica Co., Aerosil #130 by Nippon Aerosil Co., Karplex CS-7 by Shionogi Co. and Syloid #244 and 150 by Fuji Davison Co.

What is claimed is:

1. A polyamide resin composition comprising a polyamide resin, from 0.01 to 1 % by weight of fine silica based on said polyamide resin and from 1 to 99 % by weight of a silane coupling agent based on said fine silica.

2. The polyamide resin composition according to claim 1, wherein the amount of said fine silica used is from 0.05 to 0.5 % by weight based on said polyamide resin.

3. The polyamide resin composition according to claim 1, wherein the average particle diameter of said fine silica determined by the coulter counter method is from 0.01 to 20 μm.

4. The polyamide resin composition according to claim 1, wherein said fine silica is produced by the wet process.

5. The polyamide resin composition according to claim 1, wherein the amount of said silane coupling agent used is from 5 to 70 % by weight based on said fine silica.

6. The polyamide resin composition according to claim 1, wherein the amount of said silane coupling agent used is from 10 to 40 % by weight based on said fine silica.

7. The polyamide resin composition according to claim 1, wherein said silane coupling agent has an aminoalkyl group.

8. The polyamide resin composition according to claim 1 or 7, wherein said silane coupling agent is γ-(aminopropyl)triethoxysilane or N-(β-aminoethyl)-γ-(aminopropyl)trimethoxysilane.

9. A packaging material produced from said polyamide resin composition according to claim 1.

10. The packaging material according to claim 9, wherein said packaging material is a film or a sheet.

* * * * *